(12) United States Patent
Nagami et al.

(10) Patent No.: US 10,311,910 B2
(45) Date of Patent: Jun. 4, 2019

(54) MEDIA PLAYBACK APPARATUS AND SHUTTER MECHANISM

(71) Applicant: MITSUBISHI ELECTRIC CORPORATION, Tokyo (JP)

(72) Inventors: Tetsuro Nagami, Tokyo (JP); Akinori Tsukaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/752,284

(22) PCT Filed: Oct. 14, 2015

(86) PCT No.: PCT/JP2015/079014
§ 371 (c)(1),
(2) Date: Feb. 13, 2018

(87) PCT Pub. No.: WO2017/064764
PCT Pub. Date: Apr. 20, 2017

(65) Prior Publication Data
US 2018/0240497 A1    Aug. 23, 2018

(51) Int. Cl.
*G11B 17/04* (2006.01)
*G11B 17/051* (2006.01)
*G11B 17/043* (2006.01)
*G11B 33/02* (2006.01)
*G11B 25/04* (2006.01)
*G11B 17/028* (2006.01)
(Continued)

(52) U.S. Cl.
CPC .......... *G11B 17/051* (2013.01); *G11B 17/028* (2013.01); *G11B 17/04* (2013.01); *G11B 17/043* (2013.01); *G11B 17/0405* (2013.01); *G11B 23/0308* (2013.01); *G11B 25/04* (2013.01); *G11B 33/02* (2013.01); *G11B 33/08* (2013.01)

(58) Field of Classification Search
None
See application file for complete search history.

(56) References Cited

U.S. PATENT DOCUMENTS

2004/0004785 A1\* 1/2004 Seo ............... G11B 17/0405
                                                          360/99.2
2008/0222666 A1\* 9/2008 Lee ................. G11B 17/056
                                                          720/647
(Continued)

FOREIGN PATENT DOCUMENTS

JP     10247378 A  \*  9/1998
JP   2005166144 A  \*  6/2005
(Continued)

OTHER PUBLICATIONS

International Search Report with English Translation, issued in PCT/JP2015/079014, dated Dec. 22, 2015.

*Primary Examiner* — William J Klimowicz
(74) *Attorney, Agent, or Firm* — Birch, Stewart, Kolasch & Birch, LLP

(57) ABSTRACT

A cam projection sliding in a cam slot of an arm causes the arm to proceed to an arm when a shutter is in the closed position or the open position and to recede from the arm when the shutter is sliding between the open position and the closed position. A spring is thereby considerably displaced, providing a satisfactory operation of the shutter.

4 Claims, 6 Drawing Sheets

(51) Int. Cl.
*G11B 23/03* (2006.01)
*G11B 33/08* (2006.01)

(56) References Cited

U.S. PATENT DOCUMENTS

2008/0289257 A1\* 11/2008 Xu ..................... G11B 33/027
 49/388
2018/0190320 A1\* 7/2018 Nagami ................ G11B 25/04

FOREIGN PATENT DOCUMENTS

JP 2011253581 A \* 12/2011
WO WO 2006/106648 A1 10/2006

\* cited by examiner

MEDIA PLAYBACK APPARATUS AND SHUTTER MECHANISM

TECHNICAL FIELD

The present disclosure relates to a media playback apparatus including a shutter mechanism for preventing intrusion of foreign substances from an insertion slot into which a medium, such as a compact disc (CD), is to be inserted.

BACKGROUND ART

An example shutter mechanism is an opening/closing device disclosed in Patent Literature 1. The opening/closing apparatus includes two linkage members composed of thin metal plates. One end of each linkage member has a through-hole through which the external thread of a fixing bolt passes. The linkage members are fixed to a slidable chassis such that the linkage members are rotatable around their one end. The other ends of the two linkage members are rotatably and slidably connected to each other such that the linkage members shift in the longitudinal direction relative to each other. A spring is stretched between the other ends of the linkage members. The spring biases the two linkage members to bring the other ends of the linkage members close to each other.

In the opening/closing apparatus, the external treads of the fixing bolts shift through the respective slide holes in the slidable chassis, the linkage members rotate relative to the slidable chassis around their one end, and the other ends of the linkage members rotate and slide, to slide the slidable chassis relative to the front panel having an opening.

CITATION LIST

[Patent Literature 1]
WO 2006/106648

SUMMARY OF INVENTION

Technical Problem

In the opening/closing device described in Patent Literature 1, the slidable chassis has a short sliding distance, and thus the pair of linkage members has a small amount of rotation. Hence, a large difference in displacement causing stretching and contracting of the spring is not generated between when the slidable chassis is in the closed position for closing the insertion slot or in the open position for opening the insertion slot and when the slidable chassis is sliding. Thus, there is a drawback that little change in operational feeling is produced between the open/closed position and the sliding position when a user slides the slidable chassis. Another drawback is a weak spring force that cannot sufficiently hold the slidable chassis in the closed/open position.

A possible measure to enhance the force for holding the slidable chassis is to increase the spring force. However, an increased spring force generates large friction between the fixing bolt and the through-hole, leading to an increase in sliding friction and unsmooth operation accordingly. The fixing bolt and the through-hole, which are metallic, may cause an uncomfortable noise. The increased friction also lowers durability. Even if the spring force is enhanced, little change in operational feeling is produced when opening and closing the shutter. It is thus desirable to generate an enhanced force for holding the slidable chassis without a highly resilient spring when the slidable chassis is in the closed/open position.

Embodiments of this disclosure have been made to solve the above mentioned drawbacks. An object of the embodiments is to provide a large amount of displacement of a spring by a small amount of rotation of an arm and provide a change in operational feeling when the shutter opens or closes. Another object of the embodiments is to generate an enhanced force for holding a shutter in the closed/open position without a highly resilient spring.

It should be noted that the linkage members and the slidable chassis in Patent Literature 1 correspond to the arm and the shutter in the present invention.

Solution to Problem

A media playback apparatus according to embodiments of this disclosure includes: a panel having an insertion slot through which a medium is to be inserted; a base fixed to a rear face of the panel and having a pair of base slots, a pivot-axle projection, a guide projection, and a cam projection; a shutter comprising a pair of shafts engaging with the pair of base slots, and configured to slide between a closed position and an open position in response to slide of the pair of shafts through the pair of base slots to cause the shutter to cover the insertion slot at the closed position and expose the insertion slot at the open position on a front face of the panel; a pair of arms, each arm having one end engaging with one of the pair of shafts and another end engaging with each other so as to be moveable in a transverse direction in which the arms move toward or away from each other; and a spring attracting the arms toward each other, wherein one arm of the pair of arms has a pivot-axle hole rotatably engaging with the pivot-axle projection and is configured to rotate around the pivot-axle projection in response to slide of the shutter, and the other arm of the pair of arms has a long engage hole rotatably and slidably engaging with the cam projection of the base and a curving cam slot slidably engaging with the cam projection, and is configured to move in the transverse direction while rotating around the guide projection in response to slide of the shutter to cause the other end to get close to the one arm when the shutter is in the closed position or the open position and get away from the one arm when the shutter slides between the open position and the closed position by slide of the cam projection in the cam slot in response to slide of the shutter.

Advantageous Effect of Invention

In accordance with an aspect of embodiments of this disclosure, the one arm has a pivot-axle hole. The base has a pivot-axle projection fittable into the pivot-axle hole. The one arm rotates around the pivot-axle projection in response to slide of the shutter. The other arm has an engage hole and a curving cam slot. The base has a rotatable and slidable guide projection fittable into the engage hole. The base has a slidable cam projection fittable into the curving cam slot. The other arm rotates around the guide projection in response to slide of the shutter while moving in the transverse direction. The cam projection sliding into the cam slot causes the other arm to move toward the one arm when the shutter is in the closed position or in the open position and to move away from the one arm when the shutter slides between the open position and the closed position. The other arm thereby moves away from the one arm while the shutter slides between the open position and the closed position, and the spring is thereby considerably displaced, resulting in a difference in operational feeling while the shutter opens/closes. The cam slot biases the arms in the opening direction when the shutter is in the open position and biases the arms in the closing direction when the shutter is in the closed position. The force for holding the shutter can be thereby generated without enhancement of tension of the spring.

DESCRIPTION OF EMBODIMENTS

To explain this disclosure in more detail, embodiments of this disclosure will now be described with reference to the accompanying drawings.

First Embodiment

Figure 1:
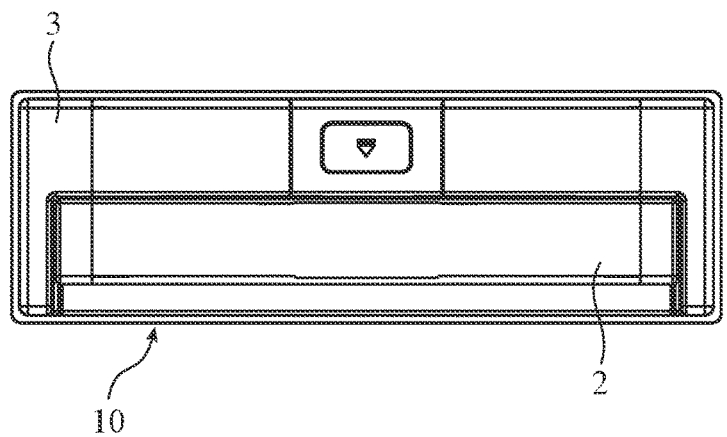
FIG. 1 is a front view of a media playback apparatus provided with a shutter mechanism having a shutter closed according to Embodiment 1 of this disclosure.
Figure 2:
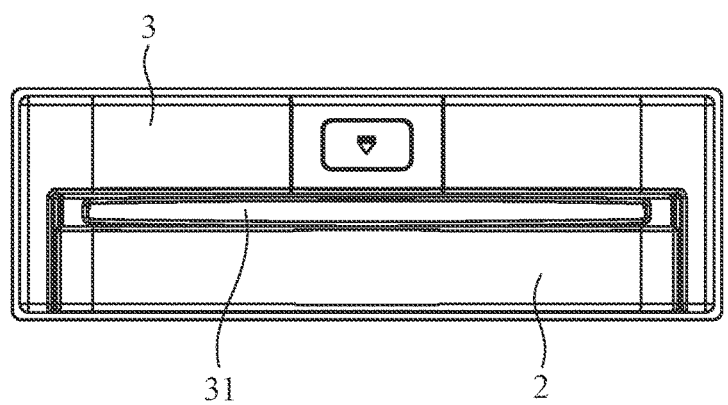
FIG. 2 is a front view of the shutter mechanism having the shutter opened.
Figure 3:
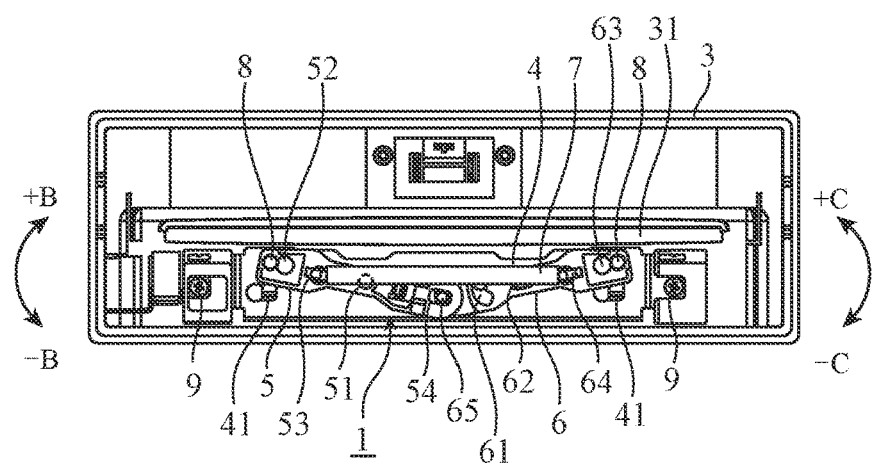
FIG. 3 is a rear view of the shutter mechanism having the shutter closed.

FIG. 1 is a front view of a media playback apparatus 10 including a shutter mechanism 1 according to First Embodiment of this disclosure, in a situation in which a shutter 2 is at a closed position. FIG. 2 is a front view of the shutter mechanism 1 with the shutter 2 at an open position. FIG. 3 is a rear view of the shutter mechanism 1 with the shutter 2 at the closed position.

The front panel 3 of the media playback apparatus 10 has an insertion slot 31 through which a medium, such as a CD, is inserted or ejected, and two guide slots 32 extending in a direction the shutter 2 slides. The insertion slot 31 illustrated in the drawing is an opening through which a CD is inserted or ejected. The insertion slot 31 may be any other component, such as a connector for mating with a universal serial bus (USB) memory. The shutter 2 is disposed on the exterior of the panel 3 to prevent intrusion of foreign objects into the media playback apparatus 10 through the opening or to protect the connector.

Hereinafter, the position of the shutter 2 covering the insertion slot 31, i.e., the position of the shutter 2 in FIG. 1 is referred to as "closed position," and the position of the shutter 2 exposing the insertion slot 31, i.e., the position of the shutter 2 in FIG. 2 is referred to as "open position."

An example of using the shutter mechanism 1 for the media playback apparatus 10 will now be described, though the shutter mechanism 1 may be used for any other apparatus.

Figure 4:
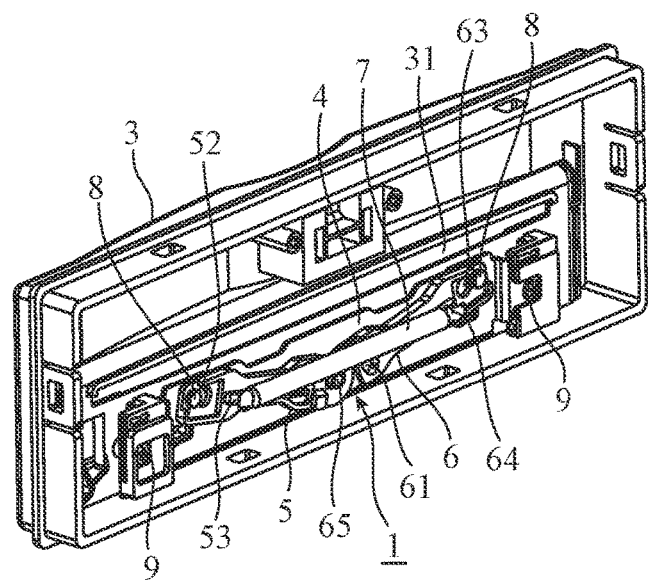
FIG. 4 is an external perspective view of the rear face of the shutter mechanism, illustrating the closed shutter.
Figure 5:
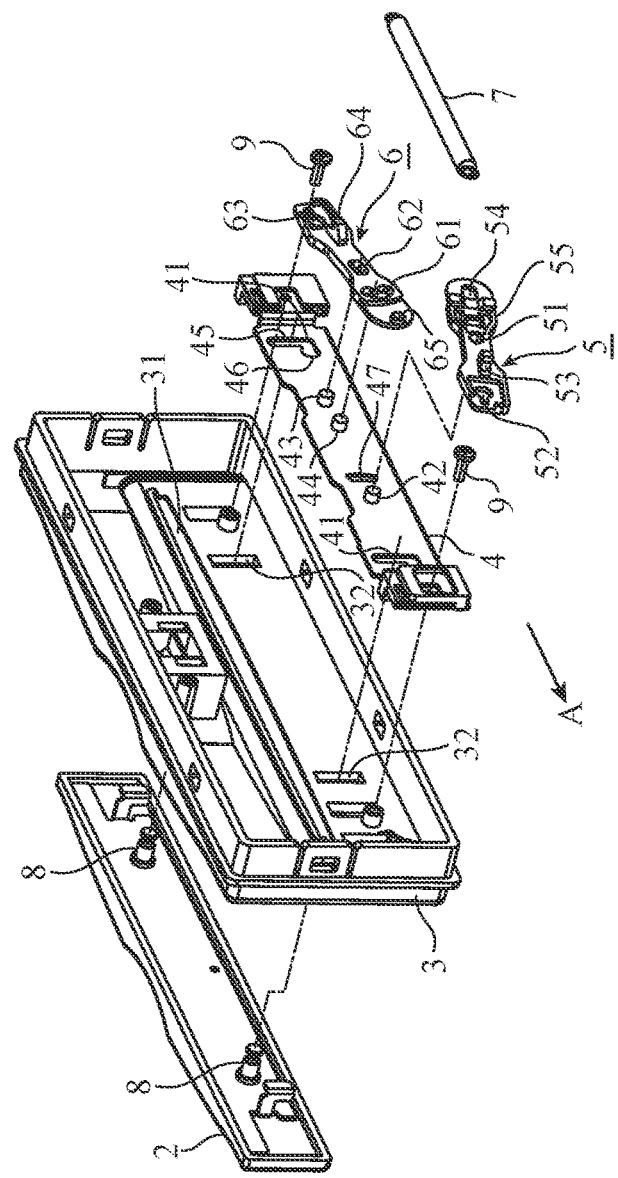
FIG. 5 is an exploded perspective view of the rear face of the shutter mechanism.

FIG. 4 is an external perspective rear view of the shutter mechanism 1 with the shutter 2 at the closed position. FIG. 5 is an exploded perspective rear view of the shutter mechanism 1. The panel 3 includes a playback unit (not shown) for reading data stored on a medium, on the rear face.

The shutter mechanism 1 includes a shutter 2, a base 4, arms 5 and 6, and a spring 7. The arms 5 and 6 and the spring 7 constitute a linking mechanism that slides the shutter 2 from the open position to closed position and vice versa and holds the shutter 2.

Figure 6:
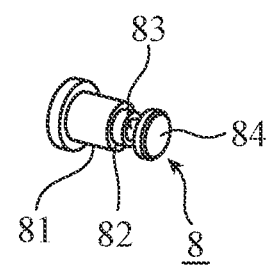
FIG. 6 is an enlarged external perspective view of a shaft provided on the rear face of the shutter.

On the rear face of the shutter 2 there are fixed two shafts 8 to be inserted in the respective guide slots 32 of the panel 3 and respective base slots 41 of the base 4. FIG. 6 is an enlarged external perspective view of one of the shafts 8 on the rear face of the shutter 2. As illustrated in FIG. 6, the shaft 8 has a cylindrical portion 81, an intermediate diameter portion 82, a small diameter portion 83, and an end portion 84, in order from the base. The cylindrical portion 81 has a diameter slightly smaller than the width of the guide slot 32. The intermediate diameter portion 82 has a diameter smaller than that of the cylindrical portion 81. The small diameter portion 83 has a diameter smaller than that of the intermediate diameter portion 82. The end portion 84 has a diameter identical to that of the cylindrical portion 81. The cylindrical portions 81 of the respective shafts 8 engage with and slide along the respective guide slots 32 of the shutter 2, to cause the shutter 2 to slide relative to the panel 3 in the sliding direction of the guide slots 32. The cylindrical portions 81 come into contact with the ends of the respective guide slots 32 to bring the shutter 2 to the open or closed position.

On the rear face of the panel 3, the base 4 composed of a thin metal plate is fixed with two screws 9. The base 4 has the two base slots 41 that engage with the two shafts 8. The base slots 41 each has a slide portion 45 and a large diameter portion 46. The slide portion 45 faces the corresponding guide slot 32 and extends in the sliding direction of the shutter 2. The width of the sliding portion 45 is larger than the diameter of the intermediate diameter portion 82 of the shaft 8, but smaller than the diameter of the cylindrical portion 81. The large diameter portion 46 extends from an end of the slide portion 45 in the direction orthogonal to the sliding direction of the shutter 2. The diameter of the large diameter portion 46 is larger than that of the end portion 84 of the shaft 8. The base 4 includes a pivot-axle projection 42 functioning as a pivot axle of the arm 5, a guide projection 43 functioning as a guide for the rotation and shift of the arm 6 in the transverse direction (described below), and a cam projection 44 for engagement with a cam slot 61 in the arm 6. These components are formed on the base 4 by spinning. The base 4 has an arcuate slot 47 having a center at the pivot-axle projection 42.

The arms 5 and 6 are disposed on the rear face, facing the playback unit, of the base 4.

Figure 7A:
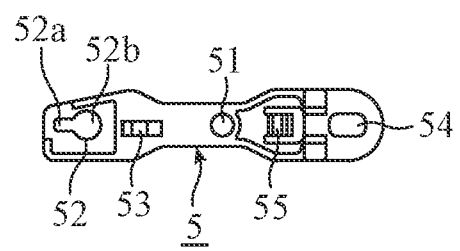
FIG. 7A is a rear view of one arm of the shutter mechanism.
Figure 7B:
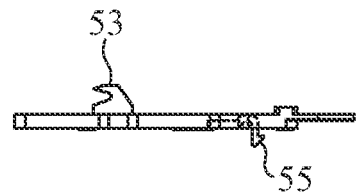
FIG. 7B is a plane view of the one arm.

FIG. 7A is a rear view of the arm 5. FIG. 7B is a plan view of the arm 5. The arm 5 is composed of plastic, such as polycarbonate (PC) or polyoxymethylene (POM). The arm 5 has a pivot-axle hole 51, a shaft engaging hole 52, a spring hook 53, an arm engaging hole 54, and a hook 55. The pivot-axle hole 51 engages with the pivot-axle projection 42 of the base 4. The shaft engaging hole 52 is disposed at one end of the arm 5. The shaft engaging hole 52, which has a key hole shape, has a rectangular portion 52a and a circular portion 52b and engages with the shaft 8. The width of the rectangular portion 52a is larger than the diameter of the small diameter portion 83 of the shaft 8, but smaller than the diameter of the intermediate diameter portion 82. The circular portion 52b has a diameter larger than that of the end portion 84 of the shaft 8. The spring hook 53 is disposed on the rear face of the arm 5 between the pivot-axle hole 51 and the shaft engaging hole 52. The spring hook 53 engages with and fixes one end of the spring 7. The long arm engaging hole 54 is disposed on the other end of the arm 5 (remote from the shaft engaging hole 52) and extends in the transverse direction in which the arms 5 and 6 move toward and away from each other. The arm engaging hole 54 engages with a protrusion 65 of the arm 6. The resilient hook 55 is disposed on the front face (adjacent to the base 4) of the arm 5 and engages with the arcuate slot 47. As illustrated in the drawing, the hook 55 achieves resilience by taking the form of a snap-fit joint.

Figure 8A:
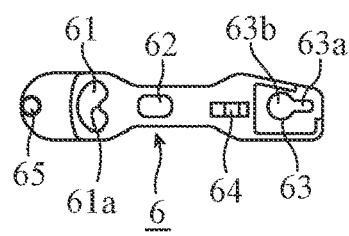
FIG. 8A is a rear view of the other arm of the shutter mechanism.
Figure 8B:
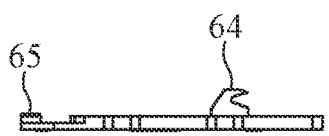
FIG. 8B is a plane view of the other arm.

FIG. 8A is a rear view of the arm 6; and FIG. 8B is a plan view of the arm 6. The arm 6 is also composed of plastic, like the arm 5. The arm 6 has a cam slot 61, an engage hole 62, a shaft engaging hole 63, a spring hook 64, and a protrusion 65. The cam slot 61 has a curved outline having a swell 61a protruding in a direction substantially orthogonal to the sliding direction of the shutter 2. The cam slot 61 engages with the cam projection 44 of the base 4. The long engage hole 62 extends in the transverse direction in which the arms 5 and 6 move toward or away from each other. The engage hole 62 engages with the guide projection 43 of the base 4 and functions as a guide for the arm 6 rotating or shifting in the transverse direction. The shaft engaging hole 63 is formed at one end of the arm 6. The shaft engaging hole 63, which has a key hole shape, has a rectangular portion 63a and a circular portion 63b and engages with the shaft 8. The width of the rectangular portion 63a is larger than the diameter of the small diameter portion 83 of the shaft 8, but smaller than the diameter of the intermediate diameter portion 82. The circular portion 63b has a diameter larger than that of the end portion 84 of the shaft 8. The spring hook 64 is disposed on the rear face of the arm 6 between the engage hole 62 and the shaft engaging hole 63. The spring hook 64 engages with and fixes the other end of the spring 7. The protrusion 65 is disposed at the end of the arm 6 remote from the shaft engaging hole 63 and engages with the arm engaging hole 54 in the arm 5.

The spring 7 is an extension spring. One end of the spring 7 is fixed to the spring hook 53 of the arm 5, and the other end is fixed to the spring hook 64 of the arm 6. By the spring 7, forces are exerted on the arms 5 and 6 in the direction such that the arms 5 and 6 are attracted toward each other.

The assembly process of the shutter mechanism 1 will now be described.

The shafts 8 fixed to the shutter 2 are inserted into the respective guide slots 32 in the panel 3 so that the shutter 2 is positioned at the open position. The shafts 8 extending through the guide slots 32 are fit to the respective large diameter portions 46 of the base slots 41 in the base 4. After the shafts 8 shift from the large diameter portions 46 to the respective slide portions 45 of the base slots 41 due to the slide of the base 4 in the direction A in FIG. 5, the panel 3 and the base 4 are fixed together with the screws 9. This fixes the shutter 2 on the front face of the panel 3 and the base 4 on the rear face of the panel 3. In this state, the guide slots 32 in the panel 3 engage with the cylindrical portions 81 of the respective shafts 8. The base slots 41 in the base 4 engage with the intermediate diameter portions 82 of the respective shafts 8. The base 4 is disposed between the cylindrical portions 81 and the end segments 84. The difference between the diameters of the cylindrical portions 81 and the end segments 84 and the width of the base slots 41 causes the shafts 8 to be fixed to the base 4 in this state.

The arm 6 is then fixed to the base 4. This is achieved by inserting the end segments 84 of the shafts 8 into the circular portions 63b of the respective shaft engaging holes 63 in the arm 6 and shifting the shafts 8 to the rectangular portions 63a by sliding the arm 6 in the direction A. The engage hole 62 engages with the guide projection 43 and the cam slot 61 engages with the cam projection 44, to fix the arm 6 to the base 4. In this state, the rectangular portions 63a of the arm 6 engage with the small diameter portions 83 of the respective shafts 8.

The arm 5 is then fixed to the base 4. This is achieved by inserting the end segments 84 of the shafts 8 into the circular portions 52b of the respective shaft engaging hole 52 in the arm 5 and shifting the shafts 8 to the rectangular portion 52a by sliding the arm 5 in the direction opposite to the direction A. The pivot-axle hole 51 engages with the pivot-axle projection 42, the arm engaging hole 54 engages with the protrusion 65, and the snap-fit joint hook 55 fits to the arcuate slot 47, to fix the arm 5 to the base 4. In this state, the rectangular portions 52a of the arm 5 engage with the small diameter portions 83 of the respective shafts 8.

The spring 7 is then fixed to the spring hook 53 of the arm 5 and the spring hook 64 of the arm 6, to complete assembly of the shutter mechanism 1.

In conventional processes, the arms 5 and 6 have been fixed to the base 4 with fastening members, such as a screw and an E-ring or cut washer, complicating assembly activity.

In contrast, in First Embodiment, the shaft engaging holes 52 and 63 engage with the small diameter portions 83 of the shafts 8, and the end segments 84 having a diameter larger than that of the small diameter portions 83 come into contact with the arms 5 and 6 around the shaft engaging holes 52 and 63, to prevent separation of the arms 5 and 6. The fixed arm 5 overlaps with the arm 6 to prevent separation of the arm 6. The arm 5 is fixed to the base 4 through the engagement of the snap-fit joint hook 55 with the arcuate slot 47. This provides the shutter mechanism 1 that can be readily assembled without a fastening member.

The operation of the shutter mechanism 1 will now be explained.

Figure 9A:
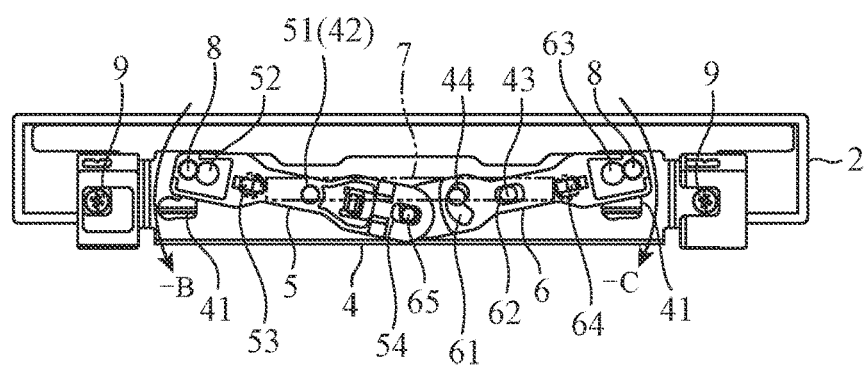
FIG. 9A is a rear view of the closed shutter of the shutter mechanism.
Figure 9B:
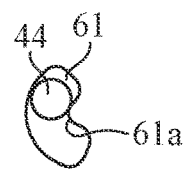
FIG. 9B is an enlarged view of a cam slot and a cam protrusion.
Figure 10A:
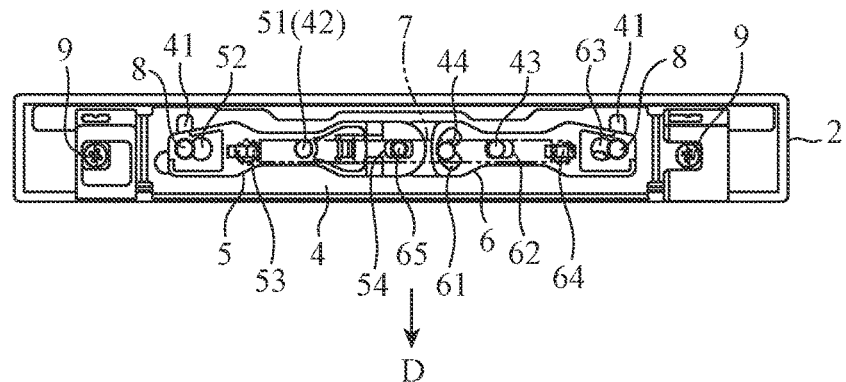
FIG. 10A is a rear view of the sliding shutter of the shutter mechanism.
Figure 10B:
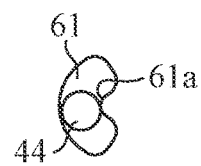
FIG. 10B is an enlarged view of the cam slot and the cam projection.
Figure 11A:
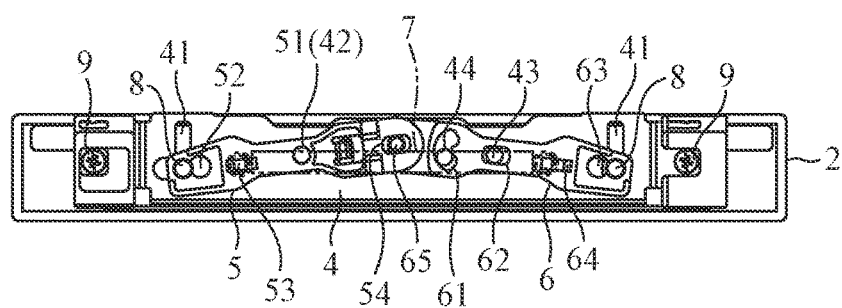
FIG. 11A is a rear view of the opened shutter of the shutter mechanism.
Figure 11B:
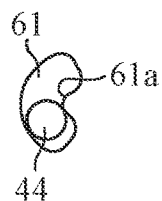
FIG. 11B is an enlarged view of the cam slot and the cam projection.

FIG. 9A is a rear view of the closed shutter 2 of the shutter mechanism 1, and FIG. 9B is an enlarged view of the cam slot 61 and the cam projection 44. FIG. 10A is a rear view of the shutter 2 in the process of sliding between the open position and the closed position in the shutter mechanism 1. FIG. 10B is an enlarged view of the cam slot 61 and the cam projection 44. FIG. 11A is a rear view of the open shutter 2 of the shutter mechanism 1. FIG. 11B is an enlarged view of the cam slot 61 and the cam projection 44. In FIGS. 9 to 11, the panel 3 is not depicted.

In the closed state of the insertion slot 31 with the shutter 2 residing at the closed position, as illustrated in FIGS. 1, 3, and 9A, loads due to resilient forces of the spring 7 are applied in such a manner that the arms 5 and 6 are attracted toward each other. The load biases the arm 5 in the direction +B in FIG. 3 around the fulcrum at the pivot-axle hole 51 engaging with the pivot-axle projection 42 and the arm 6 in the direction +C in FIG. 3 around the fulcrum at the engage hole 62 engaging with the guide projection 43. The urging force applied to the shafts 8 causes the cylindrical portions 81 to be pressed against the ends of the respective guide slots 32, thereby biasing the shutter 2 toward the closed position.

The spring hooks 53 and 64 are disposed at outermost possible positions of the arms 5 and 6, respectively, and on the rear faces of the arms 5 and 6, respectively, remote from the shutter 2, not the front faces adjacent to the shutter 2. Such a structure causes the spring 7 to readily lift the arms 5 and 6 toward the playback unit with a pulling force, and thereby cause the shutter 2 to be pressed against the panel 3. This prevents shaking of the shutter 2 and thereby prevents noise caused by the shutter 2 hitting the panel 3 due to vibration.

The term "outermost possible position of the arm 5" refers to a position closer to the shaft 8 engaging with the shaft engaging hole 52 than the pivot-axle hole 51. The term "outermost possible position of the arm 6" refers to a position closer to the shaft 8 engaging with the shaft engaging hole 63 than the engage hole 62.

In order to insert a medium into the insertion slot 31 when the shutter 2 resides at the closed position, a user applies a force to the shutter 2 against the urging force applied to the shutter 2, to slide the shutter 2 in the direction of the open position. The sliding force applied to the shutter 2 by the user is applied to the arms 5 and 6 via the shafts 8. This causes the arm 5 in the state illustrated in FIG. 9A to rotate in the direction −B around the fulcrum at the pivot-axle hole 51 and the arm 6 to rotate in the direction −C around the fulcrum at the engage hole 62.

When the shutter 2 resides at the closed position, the load of the spring 7 causes the cam projection 44 of the base 4 to engage with the cam slot 61 at a position outward of the swell 61a, as illustrated in FIG. 9B. When the user slides the shutter 2 and the arm 6 rotates in the direction −C, the cam projection 44 shifts along the inclined edge of the swell 61a relative to the cam slot 61, as illustrated in FIG. 10B. As illustrated in FIG. 10A, the guide projection 43 relatively shifts in the long engage hole 62, and the arm 6 relatively shifts away from the arm 5, in other words, in a direction causing the extension of the spring 7. The spring 7 is extended to its maximum length immediately before the cam projection 44 moves over the swell 61a, and the reactive force of the spring reaches a maximum value. Thus, a force resisting the rotation of the arm 6 steeply increases from the beginning to the midway of the rotation of the arm 6, thereby increasing the force required for sliding the shutter 2. During the transition from the state in FIG. 9B to the state in FIG. 10B, the cam slot 61 functions as a cam biasing the arms 6 and 5 engaged with each other at the other ends toward the closed position. This generates a strong force that can hold the shutter 2 at the closed position.

Immediately after the cam projection 44 passes over the swell 61a, the cam projection 44 rapidly slides relatively along the swell 61a in the cam slot 61 in response to the restoring force of the spring 7, resulting in transition from the state in FIG. 10B to the state in FIG. 11B. Thus, the arm 6 rapidly rotates in the direction −C around the fulcrum at the engage hole 62. The arms 5 and 6 are linked through engagement of the arm engage hole 54 with the protrusion 65. This linkage causes the arms 5 and 6 to move substantially in axial symmetry. Thus, the arm 5 also rapidly rotates in the direction −B around the fulcrum at the pivot-axle hole 51 in response to the rapid rotation of the arm 6 in the direction −C. The shafts 8 engage with the arms 5 and 6 move through the guide slots 32 in the direction D, and, similarly, the shutter 2 moves to the open position. In response to the cylindrical portions 81 of the shafts 8 coming into contact with the ends of the guide slots 32, the shutter 2 stops at the open position to expose the insertion slot 31, as illustrated in FIGS. 2 and 11A.

When the shutter 2 resides at the open position, loads by the spring 7 are applied in such a manner that the arms 5 and 6 are attracted toward each other. Due to the loads, the arm 5 is biased in the direction −B in FIG. 3 around the fulcrum at the pivot-axle hole 51 engaging with the pivot-axle projection 42, while the arm 6 is biased in the direction −C in FIG. 3 around the fulcrum at the engage hole 62 engaging with the guide projection 43. The biasing forces applied to the shafts 8 cause the cylindrical portions 81 to be pressed against the ends of the respective guide slots 32, thereby biasing the shutter 2 toward the open position. The cam slot 61 functions as a cam biasing the arms 6 and 5 engaged with each other at their other ends toward the open position. This generates a strong force that holds the shutter 2 at the open position.

When the user slides the shutter 2 located at the open position toward the closed position against the urging force applied to the shutter 2, the arm 5 in the state illustrated in FIG. 11A rotates in the direction +B around the fulcrum at the pivot-axle hole 51 and the arm 6 rotates in the direction +C around the fulcrum at the engage hole 62. The direction of the operation of the shutter mechanism 1 during the shift of the shutter 2 from the open position to the closed position is opposite to the operation of the shutter mechanism 1 during the shift of the shutter 2 from the closed position to the open position; hence, the explanation on the operation is omitted.

As described above, the media playback apparatus 10 according to First Embodiment includes the panel 3 having the insertion slot 31 through which a medium is to be inserted; the base 4 fixed to the rear face of the panel 3 and having a pair of base slots 41, the pivot-axle projection 42, the guide projection 43, and the cam projection 44; the shutter 2 including a pair of shafts 8 engaging with the pair of base slots 41, wherein the shutter 2 is configured to slide between a closed position and an open position in response to slide of the pair of shafts 8 through the pair of base slots 41, the shutter 2 covering the opening insertion slot 31 at the closed position and exposing the insertion slot 31 at the open position on a front face of the panel 3; a pair of arms 5 and 6, each arm having one end engaging with one of the pair of shafts 8 through the circular portions 52b and 63b and another end engaging with each other at the arm engaging hole 54 and the protrusion 65 in such a manner that the arms 5 and 6 move toward or away from each other along the transverse direction; and the spring 7 attracting the arms 5 and 6 toward each other. The arm 5 has the pivot-axle hole 51. The base 4 has the pivot-axle projection 42 fittable into the pivot-axle hole 51. The arm 5 is configured to rotate around the pivot-axle projection 42 in response to slide of the shutter 2. The arm 6 has the engage hole 62 and the curving cam slot 61. The base 4 has the rotatable and slidable guide projection 43 fittable into the engage hole 62. The base 4 has the slidable cam projection 44 fittable into the curving cam slot 61. The arm 6 rotates around the guide projection 43 in response to slide of the shutter 2 while moving in the transverse direction. The cam projection 44 sliding in the cam slot 61 is configured to cause the arm 6 to move toward to the arm 5 when the shutter 2 is in the closed position or in the open position and to move away from the arm 5 when the shutter 2 slides between the open position and the closed position.

This configuration enables the arms 5 and 6 to move away from each other and the spring 7 to be considerably displaced while the shutter 2 is sliding between the open position and the closed position. Hence, even the short slide distance of the shutter 2 and the small amount of rotation of the arms 5 and 6 can provide a change in operational feeling of the shutter 2 between the open/closed positions and its sliding.

The cam slot 61 can bias the arms 5 and 6 in the opening direction while the shutter 2 is in the open position and biases the arms 5 and 6 in the closing direction while the shutter 2 is in the closed position, generating force for holding the shutter 2 without enhancement of tension of the spring 7.

Furthermore, assembly is facilitated because the spring 7 is not required to be highly resilient. The friction with the sliding portion on which the resiliency of the spring 7 acts can also be reduced, and the service life time can be thereby extended. A linkage mechanism is used where the biasing force of the spring 7 draws the arms 5 and 6 to each other, thereby reducing the slope in the slide direction of the shutter 2.

According to Embodiment 1, the arm 6 having the cam slot 61 is composed of plastic, and the base 4 including the cam projection 44 is composed of metal. The cam slot 61 and the cam projection 44 are thus members having different material quality, resulting in a decrease in friction in sliding and enhancement of the operational feeling. The uncomfortable noise in sliding can also be reduced. The cam slot 61 composed of plastic can prevent uneven wear of the cam projection 44, and thus the lifetime can be extended.

According to Embodiment 1, the arm 5 includes the spring hook 53 provided in a position closer to the shaft 8 than the pivot-axle hole 51 and on the rear face remote from the shutter 2. The arm 6 includes the spring hook 64 in a position closer to the shaft 8 than the engage hole 62 and on the rear face remote from the shutter 2. This configuration causes the tension of the spring 7 to urge the shutter 2 to the panel 3, thereby reducing backlash of the shutter 2 and resulting in a decrease in uncomfortable noise generated.

It should be noted that the present invention can include modifications or omission of any component in the embodiment within the scope of the invention.

For example, the shutter mechanism 1 can be used not only in the media playback apparatus 10 but also in any other device requiring opening/closing by the shutter. In such a case, the shutter mechanism 1 may include at least the base 4 having the pair of base slots 41; the pivot-axle projection 42, the guide projection 43, and the cam projection 44; the shutter 2 including the pair of shafts 8 to be fitted into the pair of base slots 41, where the shafts 8 sliding in the respective base slots 41 cause the shutter 2 to slide between the two positions corresponding to the open and closed positions on the base 4; the arms 5 and 6, each having a first end and a second end, the arms 5 and 6 engaging with the respective shafts 8 at the first ends and engaging with each other at the second ends such that the arms 5 and 6 move toward or away from each other in a transverse direction; and the spring 7 drawing the arms 5 and 6 toward each other. The arm 5 has the pivot-axle hole 51. The base 4 has the pivot-axle projection 42 fittable into the pivot-axle hole 51 and configured to rotate around the pivot-axle projection 42 in response to slide of the shutter. The arm 6 has the engage hole 62 and the curving cam slot 61. The base 4 has the rotatable and slidable guide projection 43 fittable into the engage hole 62. The base 4 also has the slidable cam projection 44 fitted into the curving cam slot 61. The arm 6 rotates around the guide projection 43 in response to slide of the shutter 2 while moving in the transverse direction. Slide movement of the cam projection 44 in the cam slot 61 causes the arm 6 to move toward the arm 5 when the shutter 2 is in the open or closed position, and to move away from the arm 5 when the shutter 2 is sliding between the open position and the closed position. This configuration can likewise provide a difference in operational feeling of the shutter 2 and generate force for holding the shutter 2 without enhancement of tension of the spring 7.

INDUSTRIAL APPLICABILITY

The shutter mechanism according to this disclosure provides an operational feeling of a shutter opening and closing an aperture and is configured to generate a strong force for holding the shutter while the shutter is in the open/closed position. The mechanism is thus suitable for an apparatus used in an environment accompanied by vibration of, for example, automobiles.

REFERENCE SIGNS LIST 1 shutter mechanism; 2 shutter; 3 panel; 4 base; 5 arm; 6 arm; 7 spring; 8 shaft; 9 screw; 10 media playback apparatus; 31 insertion slot; 32 guide slot; 41 base slot; 42 pivot-axle projection; 43 guide projection; 44 cam projection; 45 slide portion; 46 large diameter portion; 47 arcuate slot; 51 pivot-axle hole; 52 shaft engaging hole; 52a rectangular portion; 52b circular portion; 53 spring hook; 54 arm engaging hole; 55 hook; 61 cam slot; 61a swell; 62 engage hole; 63 shaft engaging hole; 63a rectangular portion; 63b circular portion; 64 spring hook; 65 protrusion; 81 cylindrical portion; 82 intermediate diameter portion; 83 small diameter portion; 84 end segment

The invention claimed is:
1. A media playback apparatus comprising:
a panel having an insertion slot through which a medium is to be inserted;
a base fixed to a rear face of the panel and having a pair of base slots, a pivot-axle projection, a guide projection, and a cam projection;
a shutter comprising a pair of shafts engaging with the pair of base slots, and configured to slide between a closed position and an open position in response to slide of the pair of shafts through the pair of base slots to cause the shutter to cover the insertion slot at the closed position and expose the insertion slot at the open position on a front face of the panel;
a pair of arms, each arm having one end engaging with one of the pair of shafts and another end engaging with each other so as to be moveable in a transverse direction in which the arms move toward or away from each other; and
a spring attracting the arms toward each other, wherein
one arm of the pair of arms has a pivot-axle hole rotatably engaging with the pivot-axle projection and is configured to rotate around the pivot-axle projection in response to slide of the shutter, and
the other arm of the pair of arms has a long engage hole rotatably and slidably engaging with the guide projection of the base and a curving cam slot slidably engaging with the cam projection, and is configured to move in the transverse direction while rotating around the guide projection in response to slide of the shutter to cause the other arm to get close to the one arm when the shutter is in the closed position or the open position and get away from the one arm when the shutter slides between the open position and the closed position by slide of the cam projection in the cam slot in response to slide of the shutter.

2. The media playback apparatus according to claim 1, wherein the other arm having the cam slot is made of plastic, and the base comprising the cam projection is made of metal.

3. The media playback apparatus according to claim 1, wherein
- the one arm comprises a spring hook for fixing the spring provided at a position that is closer to the one shaft engaging with the one arm than the pivot-axle hole on a first face of the one arm, the first face being remote from the shutter, and
- the other arm comprises a spring hook for fixing the spring provided at a position that is closer to the other shaft engaging with the other arm than the engage hole on a second face of the other arm, the second face being remote from the shutter.

4. A shutter mechanism comprising:
- a base having a pair of base slots, a pivot-axle projection, a guide projection, and a cam projection;
- a shutter comprising a pair of shafts engaging with the pair of base slots and configured to slide between two positions located on the base in response to slide of the pair of shafts through the pair of base slots;
- a pair of arms, each arm having one end engaging with one of the pair of shafts and another end engaging with each other so as to be moveable in a transverse direction in which the arms move toward or away from each other; and
- a spring attracting the arms toward each other, wherein
- one arm of the pair of arms has a pivot-axle hole rotatably engaging with the pivot-axle projection and is configured to rotate around the pivot-axle projection in response to slide of the shutter, and
- the other arm of the pair of arms has a long engage hole rotatably and slidably engaging with the guide projection of the base and a curving cam slot slidably engaging with the cam projection, and is configured to move in the transverse direction while rotating around the guide projection in response to slide of the shutter to cause the other arm to get close to the one arm when the shutter is in either of the two positions and get away from the one arm when the shutter slides between the two positions by slide of the cam projection in the cam slot in response to slide of the shutter.

* * * * *